US006953637B2

United States Patent
(12) United States Patent
Hockaday et al.

(10) Patent No.: US 6,953,637 B2
(45) Date of Patent: Oct. 11, 2005

(54) CATALYTIC HYDROGEN VENT FILTER FOR BATTERIES

(75) Inventors: Robert G. Hockaday, Los Alamos, NM (US); Patrick S. Turner, Los Alamos, NM (US); Zachary R. Bradford, Los Alamos, NM (US); Marc D. DeJohn, Los Alamos, NM (US); Carlos J. Navas, Santa Fe, NM (US); F. Wade Uhrich, Los Alamos, NM (US); Heathcliff L. Vaz, Los Alamos, NM (US); L. Luke Vazul, Clearwater, FL (US)

(73) Assignee: Energy Related Devices, Inc., Los Alamos, NM (US)

( * ) Notice: Subject to any disclaimer, the term of this patent is extended or adjusted under 35 U.S.C. 154(b) by 497 days.

(21) Appl. No.: 09/870,777

(22) Filed: Jun. 1, 2001

(65) Prior Publication Data

US 2002/0182482 A1 Dec. 5, 2002

(51) Int. Cl.[7] ................................................ H01M 8/00
(52) U.S. Cl. ............................. 429/53; 429/54; 429/55
(58) Field of Search ........................... 429/7, 8, 53–57, 429/72, 82, 84–87, 62

(56) References Cited

U.S. PATENT DOCUMENTS

| | | | | |
|---|---|---|---|---|
| 2,452,066 A | | 10/1948 | Murphy | |
| 3,507,708 A | | 4/1970 | Vignaud | |
| 3,904,434 A | | 9/1975 | Sekido et al. | |
| 3,904,441 A | | 9/1975 | Badger | |
| 3,909,302 A | | 9/1975 | Mermelstein | |
| 3,939,006 A | | 2/1976 | Kozawa | |
| 4,105,830 A | | 8/1978 | Kordesch | |
| 4,191,806 A | * | 3/1980 | Levy | 429/56 |
| 4,476,200 A | * | 10/1984 | Markin et al. | 429/56 |
| 4,497,880 A | | 2/1985 | Kraft et al. | |
| 4,780,378 A | | 10/1988 | McCartney, Jr. et al. | |
| 5,077,151 A | | 12/1991 | Yasuda et al. | |
| 5,139,541 A | | 8/1992 | Edlund | |
| 5,173,376 A | | 12/1992 | Page et al. | |
| 5,362,577 A | | 11/1994 | Pedicini | |
| 5,400,211 A | | 3/1995 | Evans | |
| 5,603,656 A | * | 2/1997 | Baer et al. | 454/339 |
| 5,916,704 A | * | 6/1999 | Lewin et al. | 429/54 |
| 5,958,098 A | | 9/1999 | Heung | |
| 5,985,475 A | | 11/1999 | Reynolds et al. | |
| 6,120,931 A | | 9/2000 | Fossati et al. | |
| 6,660,425 B2 | * | 12/2003 | Jones et al. | 429/53 |

OTHER PUBLICATIONS

Yano et al., *Storage Characteristics of mercury–free alkaline manganese batteries*; Journal of Applied Electo–chemistry; vol. 28, 1988, Chapman & Hall; pp. 1221–1225.

Moss et al.; *Multilayer metal membranes for hydrogen separation*; Int. J. Hydrogen Energy; vol. 23, No. 2; 1988; Elsevier Science Ltd., pp. 99–106.

* cited by examiner

*Primary Examiner*—Michael Barr
*Assistant Examiner*—Monique Wills
(74) *Attorney, Agent, or Firm*—James Creighton Wray; Meera P. Narasimhan

(57) ABSTRACT

A selective gas permeable membrane allows hydrogen to vent from a battery while preventing other gases from entering the battery. The surface of the filter membrane also catalytically combusts hydrogen and oxygen if both are evolved inside the battery and retains the resulting water for use in the battery. The membrane is made with a porous plastic substrate coated with a thin metal film permeable to hydrogen, and additional coatings. These coatings protect the surfaces, and catalytically combust hydrogen and oxygen.

28 Claims, 4 Drawing Sheets

CATALYTIC HYDROGEN VENT FILTER FOR BATTERIES

BACKGROUND OF THE INVENTION

It is known that electrochemical cells, which contain aqueous electrolytes, may evolve gases, particularly hydrogen gas. This evolution leads to an increase in pressure inside the cell which, unless controlled, may result in its rupture and consequent leakage of cell components. Traditionally, heavy metals such as mercury have been added to inhibit this effect. With the increasing environmental concerns stemming from mercury use in batteries and battery disposal, the last few years have seen a number of technological advances that all but eliminate the use of mercury in most batteries. However, button cells still must contain some mercury due to their space constraints and, as a result, up to 3% mercury is typically added. Therefore, the environmental concerns in these button cells still remain. It would therefore be an advantageous advance to make an electrochemical cell, which contains no heavy metals and maintains the same level of performance.

Conversely, rechargeable batteries, such as those of the Ni—Cd, Ni—MH or lead-acid type, are routinely limited by the positive electrode. This is due to the fact that extra capacity is added to the negative electrode in order to prevent hydrogen buildup which can occur on overcharge. The effects of this practice are to decrease energy density and to increase the potential detrimental effect to the environment because of the added heavy metal (e.g. Cd). As additional safety features, some batteries include a resealable safety vent which releases gases if a certain internal pressure is reached. This results in loss of electrolyte and a decrease in long term performance. A clear advantage would be gained in integrating a safety feature which can eliminate or reduce the use of added capacity in the negative electrode and the safety vent.

SUMMARY OF THE INVENTION

This invention provides a selective gas permeable membrane attached over a vent hole in the case of a battery. The membrane is a disc that lets the evolved hydrogen gas vent out of the battery without letting other gases such as carbon dioxide or air into the battery and water vapor in or out. The membrane disk is sealed along the rim over the vent hole by a variety of methods such as heat seals or glues to a mechanical gasket seal. A gas porous membrane can be placed between the vent hole and the selectively permeable membrane. The selectively permeable membrane in one embodiment is made by coating a porous plastic substrate with metal film that is selectively permeable to hydrogen such as palladium or a palladium silver alloy and then coating this with a thin gas permeable plastic coating to act as a pinhole defect mitigation and surface protector. The thin gas permeable plastic coating can also serve as a rim sealant when compressed or modified in assembly. The surface of the selective membrane catalytically combusts hydrogen and oxygen if both are evolved inside the battery, thereby retaining the resulting water for the battery.

This invention discloses a method to fully eliminate the use of heavy metals from electrochemical cells by using a filter, which can vent the gases or catalytically combust them without exposing the cell to the atmosphere. This filter is composed of a selectively permeable membrane, which allows hydrogen gas to diffuse through it and vent into the atmosphere. This solution can increase the safety of the battery by reducing the buildup of gas pressure while maintaining the performance of the battery without the use of heavy metals or additives, thus making the battery environmentally benign. This invention optimizes materials use and provides a means to implement it in electrochemical cells, which results in cost reduction.

Materials which selectively permeate certain gases over others are well known. In the case of hydrogen gas, materials such as palladium and its alloys are routinely used to separate it from other gases in industrial processes. However, other metal alloys, such as those defined by the general chemical formula $AB_2$ (e.g. $ZrMn_2$) or $AB_5$ (e.g. $LaNi_5$), have been shown to possess the ability to hydride and dehydride, i.e. to incorporate and release hydrogen in and from their structures.

U.S. Pat. No. 5,096,667 assigned to Energy Conversion Devices describes these storage alloys in more detail. These materials are divided into two main categories, thermal and electrochemical alloys. The latter are characterized by hydriding and dehydriding through the use of an electrical current in ionic media. In thermal alloys, by contrast, thermal and pressure forces drive hydriding and dehydriding. Some examples of such alloys include $ZrV_2$, $ZrNi_2$ or $NiMg_2$. Typical uses for these alloys are as electrodes in rechargeable batteries and as storage media for hydrogen, with potential applications in hydrogen-oxygen fuel cells and separation and purification of hydrogen gas.

Selectively Permeable Membranes

A thin membrane of selective gas permeability can be created by coating a porous polymer substrate under vacuum with a film that has a thickness greater than the pore diameter of the substrate. The substrate may also include materials that are permeable to gases by virtue of openings in their molecular structure such as silicone rubbers or zeolites. A wide variety of materials can be used to coat the substrate and many methods of deposition may be employed. In particular, we have coated etched nuclear particle tracked polycarbonate (Nuclepore, Corning Costar) and polyester (RoTrac, Oxyphen) membranes, with pores in the 0.015 micron to 0.030 micron diameter range, and porous polyethylene (Exxon/Mobile/Tonen) with 0.03 micron pores. Pt—Pd/Ag—Pt coatings, Pd—Ag/Pd—Pd coatings, Pt/Ru—Pd—Pt/Ru coatings, Pt/Sn—Pd—Pt/Sn, and Pt—Pd—Pt coatings were made and achieved membranes that pass hydrogen while blocking other gases and liquids. The suitable materials can exhibit high hydrogen selective permeability. In general, transition metals will exhibit some ability to allow hydrogen to enter their lattice. Examples include but are not limited to: refractory metals such as V, Zr, Nb, Ta; metal alloys such as TiNi; alloys from the system Ti—V—Ni—Zr; $AB_2$-type alloys (e.g. $ZrMn_2$, $ZrCr_2$). There may be plastics and metal oxides that exhibit a sufficient selective permeability to hydrogen and can also be formed in cost-effective films that can fulfill the roll of the selectively permeable membrane. The hydrogen diffusion process through these films typically has several rate determining steps: gas diffusion to surface, absorption and hydrogen dissociation on the surface of the catalytic film, atomic hydrogen diffusion through the bulk of the membrane, desorption and hydrogen reassociation on the surface of the catalytic film, and gas diffusion away from surface.

Each one of these steps can have a rate determining effect on the mass flow rate through the membrane.

Ideally all these processes would be optimized by making the membranes as thin as possible and with catalytically active metal surfaces on either side of the membrane. It has been found (Buxbaum, U.S. Pat. No. 5,215,729) that by building the membrane in three layers, two outer surface catalysts and an inner layer of refractory metal, the diffusion membrane can improve the performance by choosing materials that optimize the performance for that particular process. Pd and Pt can act as good surface catalysts that effectively dissociate and reassociate hydrogen.

It is also suspected that the high hydrogen concentration in one metal in intimate contact with another metal can elevate the concentration of hydrogen in the low concentration metal. An example is Ta, which has high diffusion rates, low hydriding concentration, and forms surface oxides that are impermeable to hydrogen. By coating the oxide free tantalum surface with palladium it has been found that this composite has a higher mass throughput than a pure palladium foil and does not experience the destructive cracking of the pure palladium foils.

By forming catalyst and diffusion membranes in thin films of layers of hydriding and non-hydriding coatings, stress from the hydriding process can be distributed throughout the layers and avoid cracking the films and forming fines in the metal layers. An example is a platinum film on either side of a palladium film. Another example is palladium films on either side of a tantalum or platinum film. The pure palladium will experience a 6% expansion at full hydrogen bulk absorption. This expansion will cause the palladium to build up a stress that exceeds the tensile strength of the palladium, causing the film to crack. By layering the film with a film such as platinum or tantalum, that does not hydride as much or has greater strength than the palladium, the stress can be also taken up by adjacent films and the net resistance to cracking is higher for the composite than just the single film. Pure sputter deposited palladium films with the thickness of 50 nm on a 15 nm pore diameter polycarbonate Nuclepore membranes will crack when exposed to 1 atmosphere of hydrogen gas. In our experiments we have found that sputter deposited metal films on a 15 nm pore diameter polycarbonate Nuclepore substrates of 15 nm platinum on 25 nm palladium film can form hydrogen selectively permeable membranes that do not crack, or crack less, when in contact with hydrogen. Also films of 25 nm Pt on 25 nm Pd on 25 nm Pt on the same substrate did not crack when exposed to hydrogen.

Another option in forming the hydrogen hydriding films is to alloy them with other metals to give them properties that reduce their expansion or have greater strength upon exposure to hydrogen. Typical alloys are Pd/Ag, Pd/Cu and alloys with Nb, Ta, Ti, and Zr. Some alloys also have high gas diffusivity to hydrogen than pure Pd. Layering the alloys is also a possibility. In choosing the porous substrate for the selectively permeable coating there are a variety of considerations that define the acceptability of the substrate: Temperature range the membrane product will experience, the coefficient of expansion differences between the coatings, tensile strength and the range of temperatures for the product, chemical inertness to the product environment, such as being immune to corrosion by the alkaline battery or other battery electrolytes, maximum hydrogen mass flux needed in the product, substrates that can be formed in pore diameters similar to the desirable thickness of the metal film for high mass flux rates and pressure strength, and can be formed as membranes thin enough for high diffusion rates through them, and that will be mechanically tough and amenable to easy assembly with the batteries.

A variety of plastics exhibit the flexibility and the kind of properties that are desirable for a good substrate. The surface of the substrate can be corrugated and have a surface texture to give the coating on its surface flexibility and a high surface area. Plastics can be ion milled to be modified to achieve these surface textures. They can be irradiated with charged particles and etched to form specific porosity and surface structures. Many of these plastics also exhibit intrinsic molecular porosity. A construction option is to coat the substrate material before it is porous and then subsequently etch the preferentially etchable material. An example is to irradiate the plastics or dielectric after the selectively permeable membrane has been deposited and then etch the particle tracks. The etching can be stopped when sufficient porosity is achieved without losing mechanical strength in the membrane. Alternative materials for the porous substrate are ceramics, semiconductors, glasses, and porous metals. Etched porous ceramics, semiconductors, and glasses such as alumina, silicon, and Vycor generally are brittle, but small disks of these materials may have the properties needed. Raney metal foils that are etched to produce porous metal foils may also be suitable substrates. We have done our research with substrates of etched nuclear particle track plastic membranes because they could be readily obtained in uniform 15 nm diameter pores and exhibited flexibility.

A particular problem in forming pore free membranes is that of pinholes. Pinholes can form by hole defects in the substrates or particles or features on the substrate that shadow the deposition of the metal films. We have found in experiments that the pinhole effect can be mitigated by coating the membrane and metal coating with a plastic film that is gas permeable, but reduces the losses through the pinholes. We have found that by ion milling and sputter coating the permeable plastic film with a hydrogen selectively permeable metal film we could seal the membrane to all gases except hydrogen.

An effect to note is that the selective hydrogen permeable metal membranes have a high lateral diffusivity to hydrogen relative to the entrance rate into the metal, so that even when a membrane may only cover a substrate of 5–10% porosity, it will act as if the full surface area is effectively the diffusion area.

Other variations that could be used in forming the membrane on a substrate is to mount it on the battery case and then etch away the substrate to achieve high porosity and gas diffusion specifically where it is needed. Ion milling and ion etching can be used to preferentially etch specific materials and geometric areas of the membrane. Fluorocarbons are particularly sensitive to ion milling and are removed as gaseous products. Thus, a dry etch can be achieved after the membrane is mounted in the case wall. Chemical and wet chemical etching are also feasible. Surface catalytic activity as a hydrogen and oxygen recombination mechanism.

The surface catalytic activity of the metal coatings to optimize the hydrogen permeability is also suitable for the catalytic combustion of hydrogen and oxygen on the inside of the battery and on the outside of the battery. To optimize this surface, a high surface area can be achieved by high-pressure sputtering or fine powder deposition of catalysts. Having the air side of the membrane electrochemically active also may increase the mass flow rate of the membrane because it changes the catalytic step from the exiting hydrogen atom forming diatomic hydrogen to exit the surface to combining with catalytically absorbed oxygen on the catalyst surface.

This same process can enhance also the hydrogen entrance. It can speed up the hydrogen entrance and exit from the selectively permeable membrane, because the electrolyte-to-catalyst surface can be more active than the catalyst-to-gas interface. Surface catalyst contamination poisons may also be more mobile, allowing the hydrogen to reach catalytic sites and allow the contaminants to oxidize. The coatings over the surface catalyst can also protect the surfaces from contaminant contact. When coating the catalytic surfaces with solid polymer electrolytes, it is found that the electrochemical catalysis of hydrogen and oxygen occurs at ambient temperatures in a gentle smooth manner. This is in contrast to a gas-to-catalyst situation that can be hot and explosive. Diffusion of the reactants to the surface catalysts through the electrolytes limits the rate of reactants reaching the surface catalysts, while having a high catalytic activity at the catalyst surface. With gas-to-catalyst interface systems they often will not initiate until a critical temperature is reached and then, with the catalytic activity going up exponentially with temperature, this can lead to a fire or explosions.

By adding the polymer electrolytes to the surface of the catalysts, the performance of the catalysts for combustion and hydrogen absorption at the ambient temperatures at which they operate are enhanced. This could be an effect of electrolytes or ionic solutions on metal surfaces, such as when corrosion is enhanced when ionic solutions such as aqueous solutions of dissolved salts, acids or bases are in contact with metal surfaces.

Internally the rechargeable batteries can generate hydrogen and oxygen. When these gases reach the surface of platinum and palladium they can catalytically combine. Platinum and palladium can both catalyze the recombination reaction of hydrogen and oxygen to form water. In the situation where just excess hydrogen is created, it will diffuse through the membrane, and on the outer surface it can catalytically combine with the oxygen from the atmosphere to form water. Venting hydrogen from batteries could be a problem in some sealed applications. If there is sufficient water formed it could be recovered and recycled back into the battery through a separate route such as a capillary wick.

Combination of the Selective Permeable Membrane and a Mechanical Pressure Relief Vent Valve Larger batteries have pressure vent valves, or their seals are designed to vent and reseal if they produce gas. The selectively permeable membrane could be incorporated as an integral part of this valve mechanism and could be made as a single component. They also could be separate components, but they can have complementary functions. By having a mechanism that permits low gas production to be safely vented without opening a valve or breaching the seals, the battery valves can be used less or only infrequently for only high pressure excursions. Thus improving the pressure relief valves increases reliability, because with every mechanical opening there is a possibility of contamination and failure to reseal with mechanical seals.

The selective permeable membrane can be designed to act as a valve over the vent hole or be part of the battery seals. In the event of a high gas production of the battery, the membrane will open its edge seal and vent. After the venting has occurred, the membrane can reseal against the case. The membrane would be arranged on the outside of the pressure case and with a mechanical seal to the case along part of the membrane perimeter. A possible sealing material is silicone rubber, which has the sticky sealing property of making a gas tight seal to smooth surfaces. The structure of the membrane could be designed along with the permanent seals to mechanically put pressure on the seal, which can be opened when it is not pressurized.

The selective permeable membrane can also simply act as a pressure burst membrane. When the internal pressure is very high, the membrane will burst to prevent explosive breach of the battery case. The membrane can be designed to have precise burst characteristics.

The selectively permeable membrane could also be incorporated into other components that are part of the pressure wall of the battery. In particular it may be possible to incorporate the selectively permeable membrane into the gaskets of the battery. This would reduce the number of components and assembly steps needed in manufacturing batteries with the selective gas venting.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
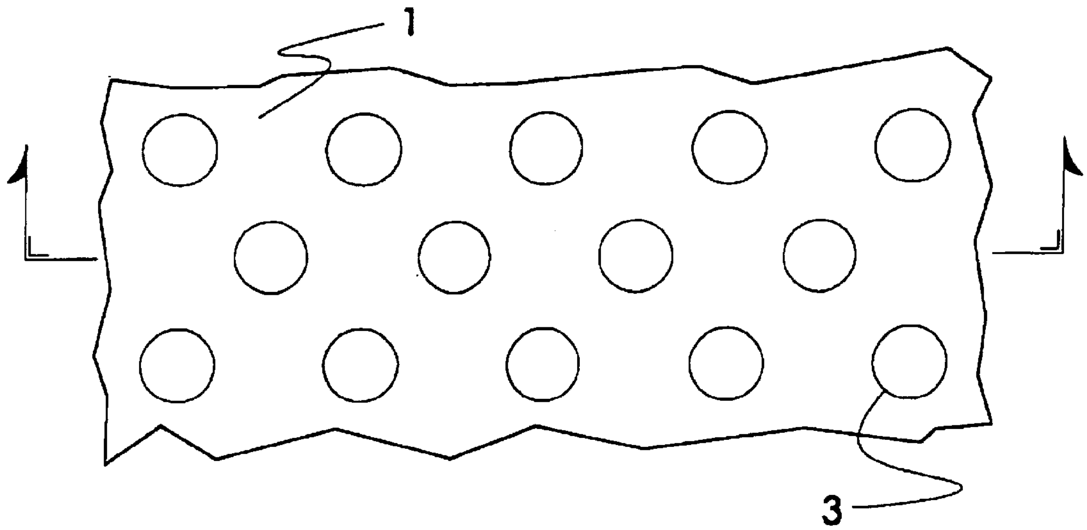
FIG. 1 is an exterior view of the etched nuclear particle tracked membrane with pores.
Figure 2:
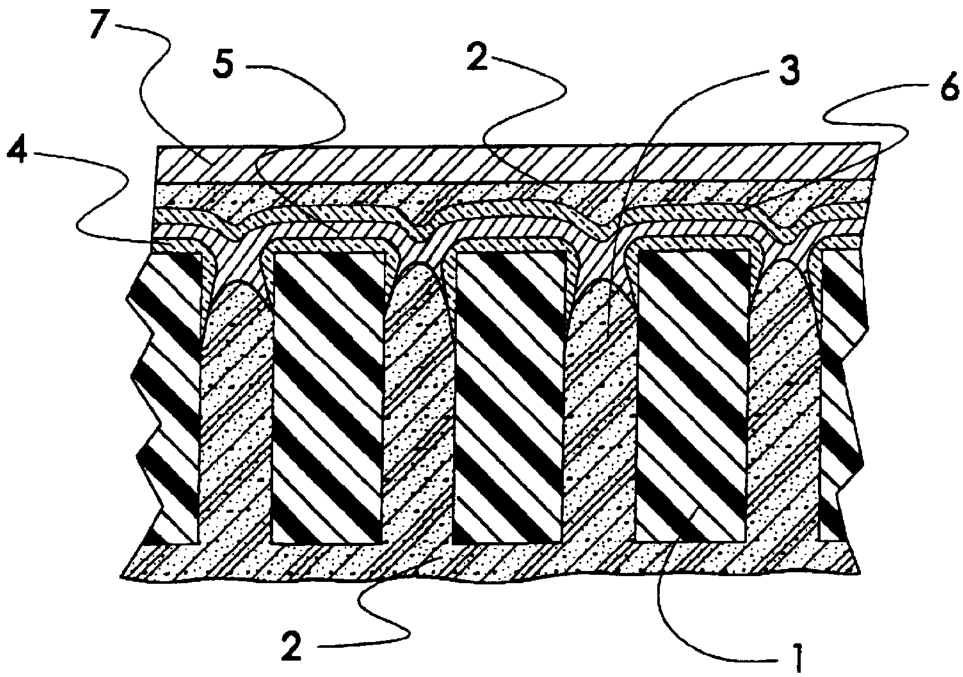
FIG. 2 is a cross-sectional view of the etched nuclear particle tracked membrane with the selectively permeable coatings and permeable outer protective coatings.

The hydrogen selectively permeable membrane 14 is constructed by starting with a porous polycarbonate plastic film 1 Nuclepore Filter (Corning CoStar) with small 0.015 micron diameter pores 3 as shown in FIG. 1 and FIG. 2. The pores 3 are formed by etching nuclear particle tracks in the plastic film 1. The pores 3 in this film 1 are 15 nm in diameter. Alternative substrate materials are: porous polyethylene (Tonen/Exxon/Mobile) with 0.03 micron diameter pores 3 and porous polyethersulfone ultra-filtration membranes (Pall Specialty Materials, 25 Harbor Park Drive, Port Washington, N.Y. 11050). A hydrogen catalytic film 4, such as platinum less than 10 nm thick is sputtered onto the plastic film 1. Alternative catalyst films 4 of Pd, Pt/Ru, Pt/Sn and Pt/Ru/Mo alloys can be formed using sputter deposition. This catalytic film 4 can be (100–1000 millitorr) sputtered under high pressure to increase the surface area of the deposit. The diffusion film 5 of an alloy of 77% Pd and 23% Ag is sputtered over the Pt film to form a film that plugs the pores and is 20 nm thick. Alternative materials for this film 5 are sputter deposited 23% Cu 77% Pd, or pure Pd. A hydrogen catalytic film 6, such as platinum, of less than 10 nm thick is sputtered onto the diffusion film 5 at pressures of 20 millitorr or less. Alternative catalyst films 6 are Pt/Ru, Pt/Sn and Pt/Ru/Mo alloys. This catalytic film 6 can be sputtered at high pressure (100–1000 millitorr) to increase its surface area. These metal coatings 4,5,6 can be deposited on either side of the plastic film 1 to give the porous membrane 1 two diffusion layers. A two-layer membrane can act to insure that random pinhole defects will not cause a leak hole. The assembly is thinly coated by dipping or painting with a gas permeable film 2 such as Nafion (Perfluorosulfonic Acid, DuPont Corporation. Alcohol solutions available through: Solutions Technology Inc., P.O. Box 171, Mendenhall, Pa. 19357), dimethylphenylmethoysiloxane dissolved in toluene and 1,1-dichloro-1fluroethane (Conformal Coat, Miller-Stephenson Chemical Company, Inc., George Washington Hwy, Danbury, Conn. 06810, USA) or PVC plastic (polyvinyl chloride) dissolved in methyl ethyl ketone, cyclohexanone, tetrahydrofuran, and acetone solvents (Oatley, 4700 W. 160th Street, Cleveland, Ohio 44135, USA). The assembly is heat cured at 60° C. for over one hour. This coating 2 can have advantageous selective gas permeability properties such as low permeability to water and high permeability to hydrogen. It has been found that by ion milling the gas permeable film 2 and then sputter depositing another hydrogen permeable 15 nm thick coating 7 of 77% Pd and 23% Ag or a repeated combination of catalysts films of Pt, 77% Pd and 23% Ag, and Pt sputtered in layers in film 7, over the gas permeable coating 2, the membrane 14 can be made free of a pinhole effect. The coating 2 can be a porous and permeable film, such as silicone rubber Conformal Coat or PVC that acts as a diffuser but when heated under pressure forms the impermeable heat seal 20 at the rim of the membrane shown in FIG. 5. The coating 2 can also be a microporous film, such as a microporous polypropylene (3M Corporation, 3M Center Building, St. Paul, Minn. 55144-1000), or porous polyethylene (Tonen Chemical Nasu Co. Ltd., 1190-13 Oaza Iguchi Nishinasunoor, Nasu-gun, Tochigi-ken, 329-2763, Japan) coated with adhesives PVC, which acts as a diffuser but when heated and under pressure forms the impermeable heat seal 20 at the rim of the membrane.

Figure 3:
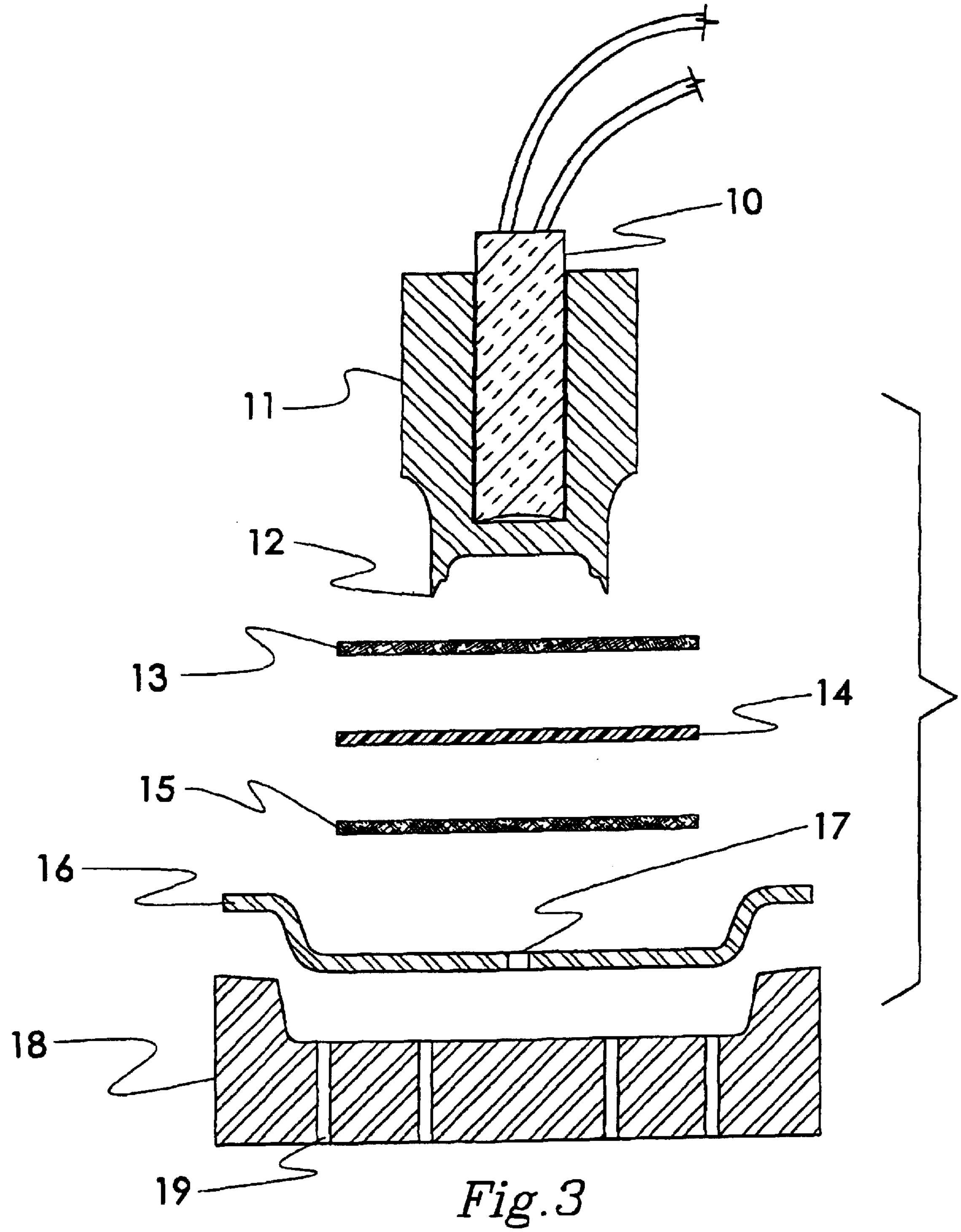
FIG. 3 is a cross-sectional view of the heat bond and cut assembly operation of the porous gas manifolds, selectively permeable membrane with the battery anode cases.

As shown in FIG. 3, the next step in the assembly is to mount the selectively permeable membrane 14 into the anode case plate 16 of the button cell battery. FIG. 3 is a cross-sectional view of the porous gas diffusion mat sheets 13, 15 and the hydrogen selectively permeable membrane sheet 14 placed between a heated anvil 11 and the anode plate 16 in a vacuum chuck 18. The anvil is heated with an internal resistance heater 10. Sheets of porous gas diffusion mat material 13 and 15 that can also carry adhesive coatings can be placed above and below the hydrogen selective membrane 14. The gas porous or permeable coating 2 on the hydrogen selective membrane 14 may also be sufficient to act as a gas diffusion manifold over the membrane and the adhesive bonding or heat seal agent. The anode plate 16 is prepared by having one or more small pinholes 17 fifty microns in diameter laser drilled in the anode plate 16. The anode plate 16 is held securely in the vacuum chuck 18 by drawing air out through the vacuum ports 19. The films are sealed to the anode plate by the heated anvil 11 coming down and pressing the films against the anode plate. The rim of the anvil 12 has a knife-edge that cuts through the plastics 13,14,15 and separates the resulting membrane disk from the sheets of plastic 13,14,15. Then the heated anvil 11 is pulled away from the assembly of membranes 13, 14 and 15 to leave the assembly heat sealed to anode plate 16. The assembly on the anode plate is then ejected from the vacuum chuck 18. The gas porous membranes 13, 15 and the selective membranes 14 sheets are moved laterally to move the punched hole away, and a new set of materials are assembled. A new anode plate 16 is placed in the vacuum chuck 18 and the process is repeated again.

A number of different techniques could be used in this membrane cutting and sealing operation. One technique is to use a concentric hold and cut arrangement in the anvil 11. The interior can have a sliding rod that initially comes down and holds the membranes firmly against the anode plate 16 and acts as a heat shield. The anvil 11 then slides down, heat-seals and cuts the membrane stack 13,14, 15 and 16. To avoid material sticking to the cutter as it is pulled away, the interior sliding rod and also the exterior ring holder continues to hold down the membrane.

A second technique to keep the membranes held down is to pressurize the interior of the anvil 11. When the anvil 11 is removed there is a gas puff that cools the heat seal. Gas puffs can also be used on the exterior of the anvil 11 to press the membranes down at the moment the anvil is pulled up and thus avoid sticking.

A third technique is to hold the membrane down with the anvil 11 with the heat and welding energy coming from a focused laser beam swept around the perimeter of the anvil 11. The laser welding and cutting can be programmed; one can adjust power, position, and dwell time to heat fuse the membranes 13, 14, 15 to the metal case 16 and trim the membranes 13, 14, 15 away from their sheet.

Figure 5:
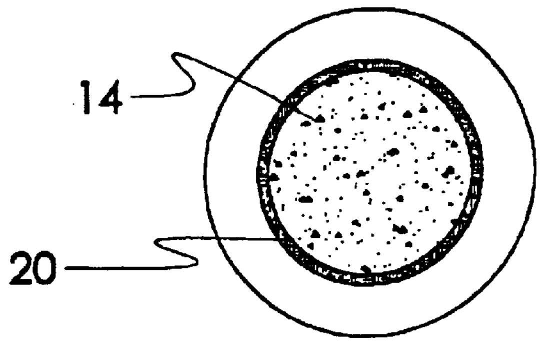
FIG. 5 is an enlarged interior view of the selectively permeable membrane sealed to the battery case.

In FIG. 5 a close up view of the assembled selective membrane 14 from the interior 22 of the anode plate 16 is shown heat-sealed 20 to the anode plate. The vent hole 17 is underneath the membrane and is shown in FIG. 4.

Figure 4:
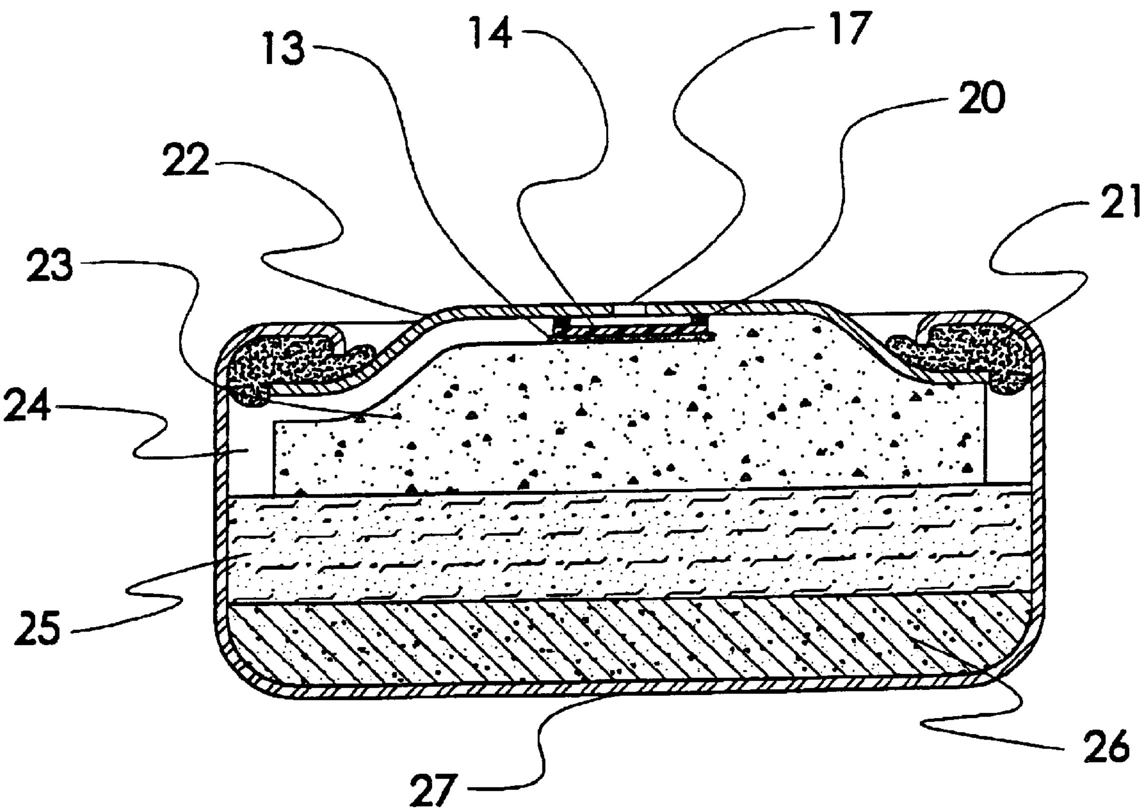
FIG. 4 is a cross-sectional view of the button cell battery with the selectively permeable membrane mounted between the zinc electrode and the battery case.

In FIG. 4 the assembled selective membrane 14 on the anode plate 16 assembled into the button cell 28 behind the zinc electrode 23 is shown. The heat seal 20 of the selectively permeable membrane 14 to the anode plate 16 is shown. The selectively permeable membrane 14 is between the zinc electrode 23 and the vent hole 17 in the anode plate 16. Grooves or simple roughness of the zinc electrode provides gas collection channels 24. The zinc electrode 23 could also be porous to allow the gas to diffuse through it. The basic components of the button cell are shown: seal and insulator 21, electrolyte potassium hydroxide soaked mat 25, manganese dioxide electrolyte paste 26, the carbon electrode 29 and cathode case plate 27.

Figure 7:
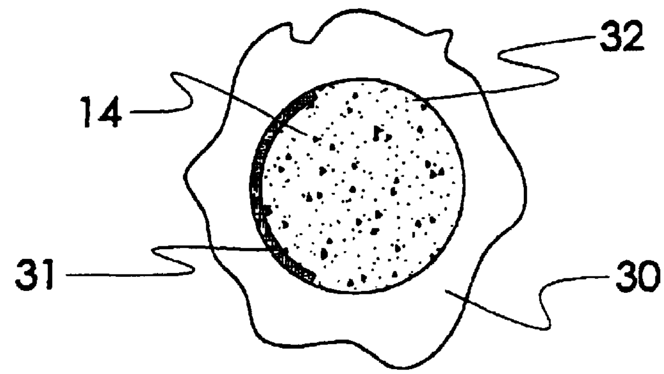
FIG. 7 is a view of the selectively permeable membrane mounted on the battery case over the vent hole.
Figure 6B:
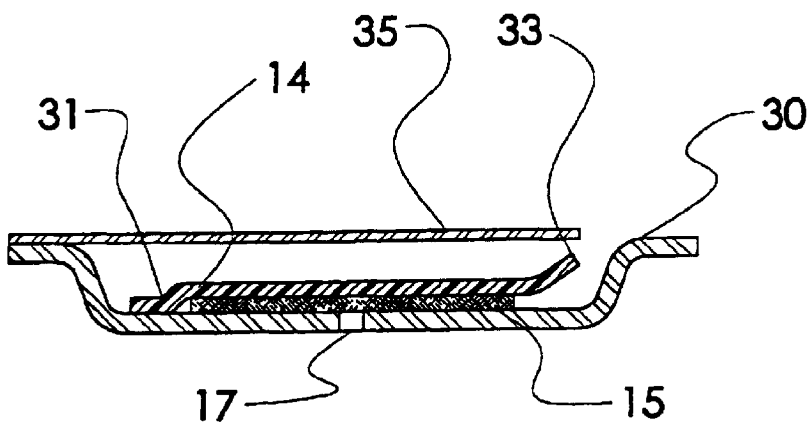
FIG. 6*b* is a cross-sectional view of the dual functioning selectively permeable membrane and high pressure vent valve mounted on the outside of the battery case. The battery case is dimpled and the protective cover is over the assembly. This view shows the membrane valve venting.
Figure 6A:
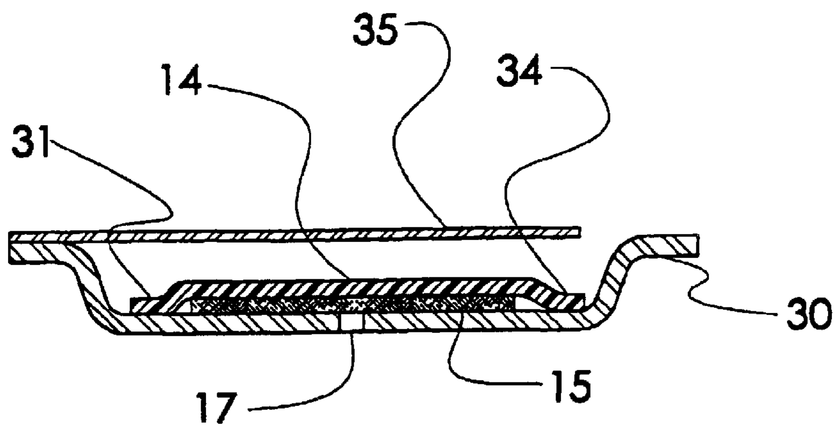
FIG. 6*a* is a cross-sectional view of the dual functioning selectively permeable membrane and high pressure vent valve mounted on the outside of the battery case. The battery case is dimpled and the protective cover is over the assembly. This view shows the membrane valve sealed.

In FIG. 7 the pressure valve relief membrane alternative arrangement is shown. The selectively permeable membrane 14 is sealed 31 to case 30 partially around the rim 32 of the selectively permeable membrane 14.

In FIG. **6*b* the pressure valve relief membrane arrangement is shown with the seal 31 in place and rim seal 33 opened. This would occur when the pressure is high enough in the battery to open the rim seal 33. The sealed region 31 is shown. The seal to the battery case 30, can be a seal such as silicone rubber on a smooth surface that gradually makes a gas tight seal. For this venting valve arrangement the case 30 will be dimpled in to accommodate the membrane being on the outside of the battery case 30. The pinhole 17 is shown under the porous gas diffusion membrane 15 and the selectively permeable membrane 14. A vented metal cover 35 can be spot welded over the dimpled case wall to protect the membrane 14 and allow for electrical contact with anywhere on the battery anode 22** case.

In FIG. **6*a* the selectively permeable membrane 14 is shown sealed 31 against the case 30**.

While the invention has been described with reference to specific embodiments, modifications and variations of the invention may be constructed without departing from the scope of the invention, which is defined in the following claims.

We claim:

1. A membrane battery vent, comprising a battery case, at least one perforation in the battery case, a porous substrate adjacent the perforation in the battery case for venting batteries, a gas selective permeable membrane integral with the porous substrate, further comprising a catalytic layer and a diffusion layer on the membrane forming a gas recombination mechanism for recombining gases evolved from within the battery case and for venting the battery.

2. The membrane of claim 1, wherein the membrane passes hydrogen gas preferentially over other gases.

3. The membrane of claim 1, wherein the membrane passes hydrogen gas preferentially over other gases of water, carbon dioxide, and oxygen.

4. A membrane battery vent, comprising a battery case, at least one perforation in the battery case, a porous substrate adjacent the perforation in the battery case for venting batteries, a gas selective permeable membrane integral with the porous substrate, further comprising a catalytic layer and a diffusion layer on the membrane forming a gas recombination mechanism for recombining gases evolved from within the battery case and for venting the battery, further comprising a catalytic surface on both sides of the membrane for acting as a gas recombination mechanism of gases evolved from within the battery case.

5. The membrane of claim 1, wherein the membrane further comprises a catalytic surface from catalysts metals from the transition metal elements, one or more components of platinum, palladium, nickel, copper, silver, chromium, molybdenum, tungsten, cobalt, iron, ruthenium, titanium, zirconium, vanadium, niobium, tantalum, or be alloyed with elements such as carbon, silicon and tin for acting as a gas recombination mechanism of the gases hydrogen and oxygen evolved from within the battery case.

6. The membrane of claim 1, wherein the membrane is formed by coating a porous substrate.

7. The membrane of claim 1, wherein the membrane is formed by coating a porous substrate with selectively permeable materials.

8. The membrane of claim 1, wherein the membrane is formed by coating and plugging pores of a substrate of etched nuclear particle track dielectric films with selectively permeable materials.

9. The membrane of claim 1, wherein the membrane is formed by coating and plugging pores of a substrate, porous plastics, porous metals, porous glasses, porous ceramics, or porous semiconductors, with selectively permeable materials.

10. The membrane of claim 1, wherein the membrane is formed by coating and plugging pores of a substrate, etched nuclear particle track dielectric films of polycarbonate plastic, polyester, polyimide, or polypropylene, with selectively permeable materials.

11. The membrane of claim 1, wherein the membrane is formed by coating and plugging pores of a substrate, of porous polyethylene, porous polyethersulfone, with selectively permeable materials.

12. The membrane of claim 1, wherein the membrane is formed by coating a porous substrate with selectively hydrogen permeable materials selected from the transition metals, transition metal compounds or alloys.

13. The membrane of claim 1, wherein the membrane is formed by coating a porous substrate with vacuum deposited selectively permeable materials of Pt, Pd and its alloys, Pd/Ag alloy, Pd/Cu alloy, Ti/Ni alloy, $AB_2$ (e.g. $ZrMn_2$) or $AB_5$ (e.g. $LaNi_5$) coatings, La, Ti, Zr, V, Nb, Ta, Cr, Mo, W, Fe, Ru, or Co.

14. The membrane of claim 1, wherein the membrane has a gas permeable coating on it.

15. The membrane of claim 1, wherein the membrane further comprises a gas permeable coating of silicone rubber, polyvinyl chloride, polyethylene, fluorosilicone, nitrile silicone, natural rubber, polytetrafluroethylene, polymer electrolytes, or perfluorosulfonic acid.

16. The membrane of claim 1, wherein the membrane further comprises electrolytes in contact with selective permeable films for electrochemical catalysis of hydrogen, or oxygen or catalytic promotion of hydrogen oxygen recombination.

17. The membrane of claim 1, wherein the membrane further comprises a gas permeable coating of electrolytes in contact with selective permeable films for electrochemical catalysis of hydrogen, or oxygen or catalytic promotion of hydrogen oxygen recombination also provides the diffusion layer for limiting recombination to a surface of catalysts or rate of recombination.

18. The membrane of claim 1, wherein the membrane further comprises a non-selective gas permeable coating and hydrogen selectively permeable coating coated over a non-selective gas permeable coating.

19. The membrane of claim 1, wherein the membrane further comprises diffusion gas mats placed on the membrane.

20. The membrane of claim 1, further comprising a seal for sealing the membrane to the battery case and for diffusing gas through the perforation in the battery case.

21. The membrane of claim 20, wherein the seal is provided with a heat or pressure stamp at least partially around the perforation in the battery case.

22. The membrane of claim 1, wherein the membrane is formed by coating and plugging pores of a porous substrate, thereby forming a porous membrane, and further comprising layers of selectively permeable materials on the substrate and gas diffusion mats, sealed to the substrate and sealed to the battery case for diffusing gas through the perforation in the battery case.

23. The membrane of claim 1, wherein the membrane is formed by coating and plugging pores of substrate, etched nuclear particle track dielectric films with selectively permeable materials, and further comprising gas diffusion mats sealed to the membrane and to the battery case for diffusing gas through a vent hole in the battery case.

24. The membrane of claim 1, wherein the membrane further comprises a pressure relief valve.

25.The membrane of claim 1, wherein the membrane forms a pressure relief valve or burst foil.

26. A battery vent comprising a battery case having at least one opening and a gas selective permeable catalytically active gas recombination membrane secured over the opening in the battery case for venting batteries.

27. A gas vent for batteries, comprising a sealed battery container, a perforation in the sealed battery container, a gas selective permeable catalytically active membrane vent and gas recombination mechanism for batteries, integral with a porous substrate and covering the perforation in the sealed battery container and a perimeter seal extending at least partially around the membrane, and sealing at least a peripheral portion of the membrane vent to the battery container around the perforation.

28. A battery vent apparatus comprising a battery case having at least one opening and a gas selective permeable catalytically active gas recombination membrane secured over the opening in the battery case for venting batteries.

* * * * *